(12) United States Patent
White

(10) Patent No.: US 9,640,072 B2
(45) Date of Patent: May 2, 2017

(54) ENTRANCE AND EXIT RAMP SAFETY SYSTEM

(71) Applicant: Tony D. White, Dallas, TX (US)

(72) Inventor: Tony D. White, Dallas, TX (US)

(*) Notice: Subject to any disclaimer, the term of this patent is extended or adjusted under 35 U.S.C. 154(b) by 120 days.

(21) Appl. No.: 13/909,219

(22) Filed: Jun. 4, 2013

(65) Prior Publication Data

US 2015/0146001 A1    May 28, 2015

Related U.S. Application Data

(60) Provisional application No. 61/655,186, filed on Jun. 4, 2012.

(51) Int. Cl.
| | |
|---|---|
| *E01F 13/04* | (2006.01) |
| *H04N 1/00* | (2006.01) |
| *E01F 9/019* | (2006.01) |
| *G08G 1/09* | (2006.01) |
| *H04N 7/18* | (2006.01) |
| *G08G 1/07* | (2006.01) |
| *H04N 5/232* | (2006.01) |
| *E01F 13/06* | (2006.01) |
| *E01F 13/10* | (2006.01) |

(52) U.S. Cl.
CPC .......... *G08G 1/075* (2013.01); *E01F 13/046* (2013.01); *E01F 13/06* (2013.01); *E01F 13/105* (2013.01); *H04N 5/23203* (2013.01)

(58) Field of Classification Search
None
See application file for complete search history.

(56) References Cited

U.S. PATENT DOCUMENTS

| | | | | |
|---|---|---|---|---|
| 4,320,380 | A * | 3/1982 | Berard | E01F 13/06 340/935 |
| 5,381,155 | A * | 1/1995 | Gerber | G08G 1/054 340/936 |
| 6,099,200 | A | 8/2000 | Pepe | |
| 6,312,188 | B1 | 11/2001 | Ousterhout | |
| 6,370,475 | B1 * | 4/2002 | Breed | B60N 2/2863 340/436 |
| 6,997,638 | B2 | 2/2006 | Hensley | |
| 7,950,870 | B1 | 5/2011 | Thompson | |

* cited by examiner

*Primary Examiner* — Frederick Bailey
(74) *Attorney, Agent, or Firm* — Global Intellectual Property Agency, LLC; Daniel Boudwin

(57) ABSTRACT

A traffic safety system is provided for controlling the entry of motorists onto one way roads. The system has a motion detection unit which identifies the presence of motor vehicles travelling the wrong direction on one way roads, highway exit ramps and entrance ramps. Upon detection of a vehicle, the system activates audible and visual warnings. If the motorist does not stop moving, a barrier will deploy and a camera unit will photograph the license plate of the vehicle before transmitting same to local authorities. Additionally, a set of warning indicators positioned at a far end of the road are provided, which illuminate when the system is deployed, notifying travelers of a road blockage.

6 Claims, 3 Drawing Sheets

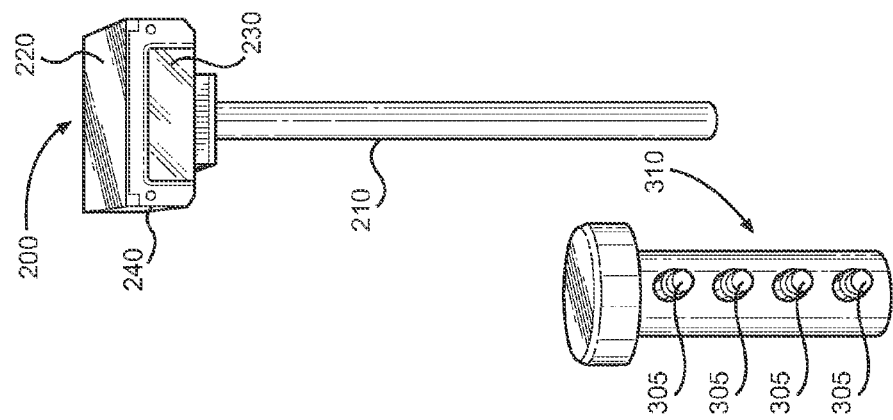
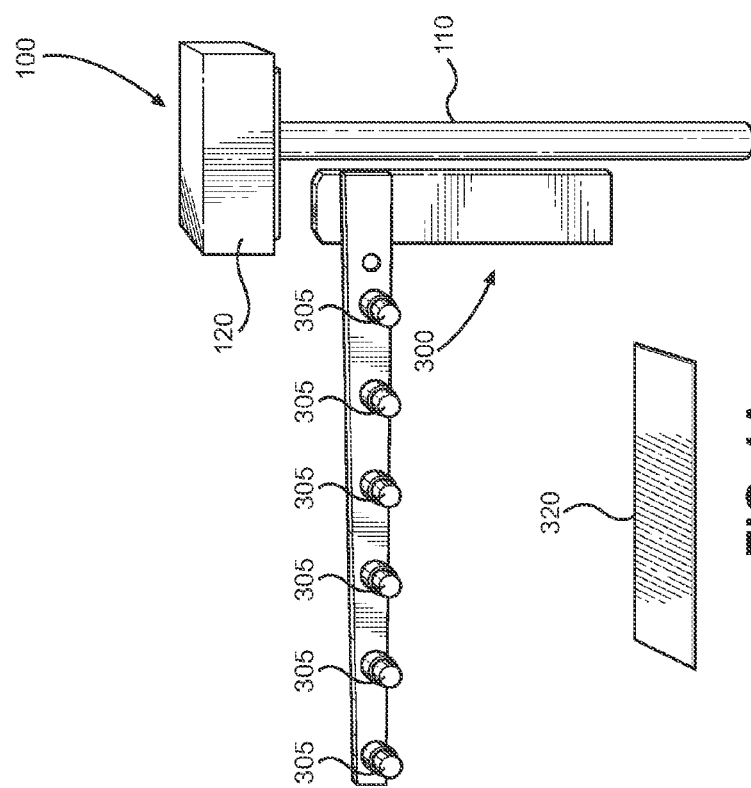

ENTRANCE AND EXIT RAMP SAFETY SYSTEM

CROSS REFERENCE TO RELATED APPLICATION

This application claims the benefit of U.S. Provisional Application No. 61/655,186 filed on Jun. 4, 2012 entitled "Exit and Entrance Ramps." The patent application identified above is incorporated here by reference in its entirety to provide continuity of disclosure.

BACKGROUND OF THE INVENTION

Field of the Invention

The present invention relates to a traffic safety system. More specifically, it pertains to an automated motion detection system installed at the entrance to one way streets and highway ramps. If a car begins to enter the one-way street going the wrong way, a barrier rises out of the road, blocking the automobile's path. Other visual and audible alerts may sound, to further deter the driver from continuing. If the driver collides with the barrier, or does not retreat, notification is sent to local authorities, and warning placards placed further down the one-way street will illuminate, thereby notifying other motorists of the danger ahead.

Cities are often full of one-way streets that enable traffic flow in a single direction along their length. Road signs are posted along these streets to indicate the proper flow of traffic. Despite the warnings, motorists occasionally find themselves driving the wrong way down a one-way road. Tourists, impaired persons, and those who are inebriated, may be particularly susceptible to driving against the flow of traffic.

Like one-way streets, highway exit and entrance ramps usually enable traffic flow in only one direction. Exit ramps provide motorists with a thoroughfare for leaving the high-speed traffic of a highway, while entrance ramps provide a stretch of road where motorists can increase their speed prior to entering a highway area. Because of the high speed of travel maintained on highways, exit and entrance ramps are usually occupied by motorists gathering speed or slowing down from a high speed. Serious injury and even death can result from collisions with automobiles and persons on exit and entrance ramps.

Concrete barriers, arm gates, road spikes, and other deterrents are common in restricted areas, to reduce the likelihood that unauthorized users will enter the premises. But these methods are not employed on common through-fares or on highway ramps because the deterrents block a portion of the path, thus slowing the flow of traffic. Such restrictions may be dangerous in high speed areas, as the user has little warning of the impending blockades.

A safety system is needed that warns motorists that they are proceeding the wrong way down a one-way thoroughfare, and then erects a barrier if the motorist fails to stop or retreat from the area.

Description of the Prior Art

The present invention relates to an automated safety system for one-way thoroughfares. A motion detection sensor placed at the entrance of the thoroughfare detects vehicles entering the road from the wrong direction. When a motorist is detected, a barrier is raised or a hinged arm lowered. Audible and visual signals such as flashing lights and alarm whistles are activated to alert the motorist. If the motorist does not cease driving, a camera is activated, photographs the vehicle license plate and transmits the images to local law enforcement. The following list of safety systems is a representative of prior art deemed relevant to the present disclosure. The prior art is presented herein for the purpose of highlighting the benefits of the present invention and differentiating it from the failings of the known art.

Roadblocks come in a variety of sizes and configurations. Some are large solid barriers, others are pivoting arms that can be raised and lowered, some are spikes that rise out of the ground and some are merely collections of brightly colored objects used for visual signaling. These devices can be manually operated or automatically positioned depending on the type of barrier and the need for a permanent deterrent. An example is disclosed in Hensley, U.S. Pat. No. 6,997,638. The Hensley device is one or more underground ballards that can be raised via a human operator's interaction with a spring based extension system or may be raised automatically by the system. Unlike the present invention, the Hensley device does not disclose a means for notifying local authorities nor does it contemplate photographing of a vehicle license plate for identification purposes. A similar device with the same drawbacks is disclosed in Pepe et al, U.S. Pat. No. 6,099,200.

Non-destructive vehicle impediments are also used in the art. These devices employ netting, tire spikes, foam, and other means for slowing a vehicle without causing serious damage to the structural integrity of the automobile. Ousterhout, U.S. Pat. No. 6,312,188 discloses a non-destructive roadblock system having two supports disposed on opposing sides of a road, and a mesh barrier stretched therebetween. When traffic flow is permit, the mesh barrier is lowered into a trench, permitting cars to pass over. When a vehicle is out of control, the barrier is raised so that it can catch the front of the vehicle and slow its momentum. Deceleration may also be aided by deployment of tire spikes from the trench area. This system does not disclose a camera for photographing license plates, or the notification of local authorities.

Another non-lethal vehicle impediment system is discloses in Thompson et al, U.S. Pat. No. 7,950,870. The Thompson device has a pair of flexible gates that can be deployed one after the other. Impact between a vehicle and the gates transfers energy to the flexible gates, thereby slowing the vehicle. When not in use, the gates are lowered onto the road surface or stored in a trench. The present invention provides additional benefits in that it notifies law enforcement of gate breaches and photographs the license plate of motorists stopped by the system.

These prior art devices have several known drawbacks. They do not notify authorities of collisions with the barrier, nor do they collect any photographic evidence of such collisions. Nor do these devices teach a means for notifying motorists at other points on the road that an accident has occurred ahead. The present invention addresses these shortcomings and provides solutions to each. It substantially diverges in design elements from the prior art and consequently it is clear that there is a need in the art for an improvement to existing traffic safety systems. In this regard the instant invention substantially fulfills these needs.

SUMMARY OF THE INVENTION

In view of the foregoing disadvantages inherent in the known types of vehicle barrier systems now present in the prior art, the present invention provides a new safety and notification functionality wherein the same can be utilized for providing convenience for the user when stopping vehicles from travelling the wrong way down one-way roads and ramps.

It is therefore an object of the present invention to provide a new and improved traffic safety system that has all of the advantages of the prior art and none of the disadvantages.

It is therefore an object of the present invention to provide a traffic safety system that alerts motorists that they are going the wrong way on a one-way thoroughfare.

Another object of the present invention is to provide a traffic safety system that automatically deploys barriers, and deterrent measures upon detecting the entrance of a motor vehicle into a one-way area.

Yet another object of the present invention is to provide a traffic safety system that signals motorists at a far end of the one-way thoroughfare that a barrier has been deployed and the way ahead is blocked.

Still another object of the present invention is to provide a traffic safety system that notifies local authorities regarding deployment of barriers, and any collisions therewith.

A further object of the present invention is to provide a traffic safety system that collects photographic evidence of the license plates of vehicles that activate the system.

Another object of the present invention is to provide a traffic safety system that promotes safety and reduces head-on collisions between motorists, rather than simply preventing entry into restricted areas.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1A shows a perspective view of the motion detection unit of the present invention and an arm-style barrier in use.

FIG. 1B shows a perspective view of the camera and notification unit of the present invention in conjunction with a column style barrier.

DETAILED DESCRIPTION OF THE INVENTION

Figure 2:
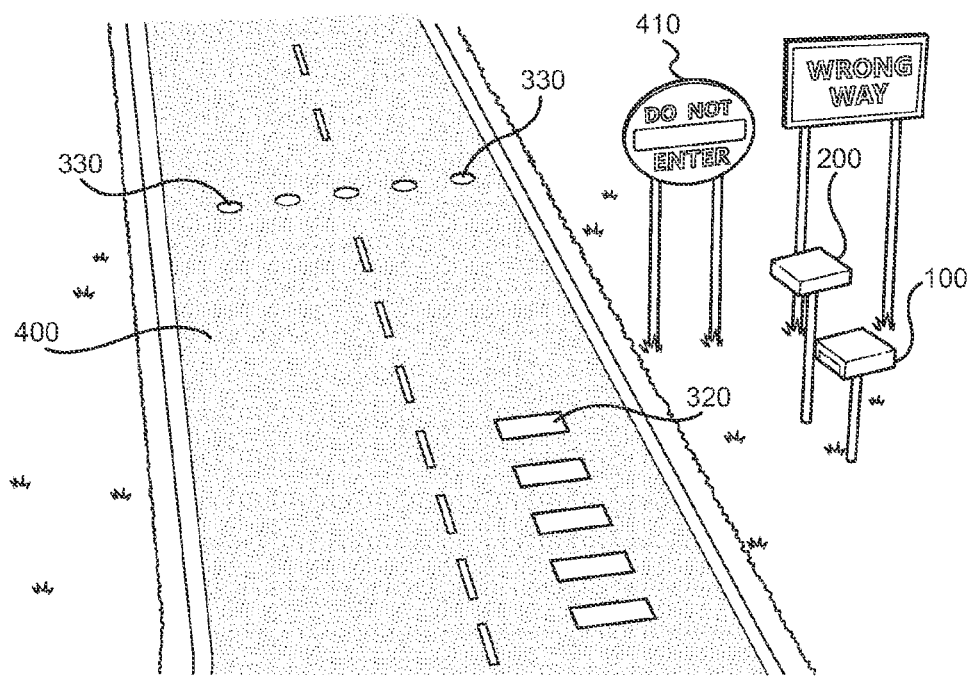
FIG. 2 shows a perspective view of the traffic safety system in use and prior to activation.

Reference is made herein to the attached drawings. Like reference numerals are used throughout the drawings to depict like or similar elements of the traffic safety system. For the purposes of presenting a brief and clear description of the present invention, the preferred embodiment will be discussed as used for stopping vehicles from proceeding the wrong way down one-way roads and ramps. The figures are intended for representative purposes only and should not be considered to be limiting in any respect.

Referring now to FIG. 1A, there is shown a motion detection unite and an exemplary barrier. The motion detection unit 100 is positioned in front of and to the side of the hinged-arm barrier 300, and near a series of rumble strips 320. The motion detection unit has a support 110 that provides connection between the detector housing 120 and the ground. Alternatively, the housing may be mounted in a tree, or on a road sign or other structure. In either implementation, the motion detection unit should be positioned such that the internal motion detection sensor has a clear and unobstructed line of sight to the road it monitors.

The assembly is placed at the entrance to a one-way road or highway entrance or exit ramp, to detect motorists going the wrong way on the road. A sensor disposed within the motion detection unit 100 identifies traffic entering the road and activates a barrier 300, as well as lights 305 and an audible alert. In the depicted example the barrier is a hinged arm that pivots about a post. This arm is raised when no oncoming traffic is detected and lowered when the motion sensor detects traffic. It is preferred that the barrier and the motion detection unit are electrically connected via an underground wire. Wireless communication means may also be employed to signal the barrier that activation is required.

Turning now to FIG. 1B, there is shown a camera unit disposed behind an exemplary barrier. The camera unit 200 has a housing 220 with a window 240 on at least one side, so that the camera has an open visual field to photograph license plates. Indicator lights 240 on the camera unit housing provide quick visual reference as to when the camera is properly operating. In the depicted configuration the camera is positioned behind a cylindrical barrier 310$m$ such that the camera faces the direction from which system activators approach. The system is configured to take a photograph as soon as the system is activated, and again if the vehicle advances past a predetermined point. The predetermined point is located at a distance close to the barrier, such that a collision between the vehicle and barrier is highly likely or imminent. Precise location of the predetermined point will vary according to the average rate of speed on the road and the size of vehicles utilizing the road.

Like the motion detection unit featured in FIG. 1.A the camera unit 200 has a support stand 210. This support structure may be a post, as shown in FIG. 2B or any other permanent or semi-permanent structure. The support height is sufficient to place the camera unit above the barrier, so that the camera has a clear visual field. Alternatively the camera may be placed close to the motion detector and faced in an opposing direction so that it can photograph rear license plates of approaching cars.

The camera unit has a communication interface so that it can transmit collected photographs to local law enforcement, and can send activation signals to warning signs further down the road. Communication links may be coaxial cable buried underground and running from the camera unit to a junction, and the warning signs. Alternatively, wireless signals may be used. Bluetooth communication may be particularly effective for communication between the camera unit and warning signs when placed on a highway exit or entrance ramp, because the relatively short length of such ramps implies that the units will not be positioned far apart. Warning signs may consist of standard road signs with lights, or text made of lights that illuminate upon activation. These precautions notify motorists travelling along the road in the proper direction, that there is a blockage ahead, due to activation of the safety system.

Referring to FIG. 2 there is shown an overhead view of the system when it is not activated. The motion detection unit 100 and camera 200 are positioned along one side of a road 400. A series of rumble strips 320 are disposed along the road near the position of the motion detection unit. Ruble strips are made of a durable material that is mounded or adhered to the upper surface of a road, and create a loud noise when a vehicle drives over them. These strips are an indicator that the motorist is no longer heading the correct way down the road. Warning signs in the form of standard traffic signs 410, or illuminated placards may also be placed near the motion detection and camera units.

Barriers, or ballards, may be retracted into the ground, as shown in the figure, when the system is passive. Apertures 330 in the road receive the barriers during storage. Trenches, and other storage compartments may be used. The use of retractable ballards is known in the art the selection and installation of an appropriate roadblock will be apparent to one of ordinary skill in the art. As previously discussed herein, the form of the roadblock may vary, including such devices as hinged arms, netting, and solid ballards of different shapes and sizes.

Figure 3:
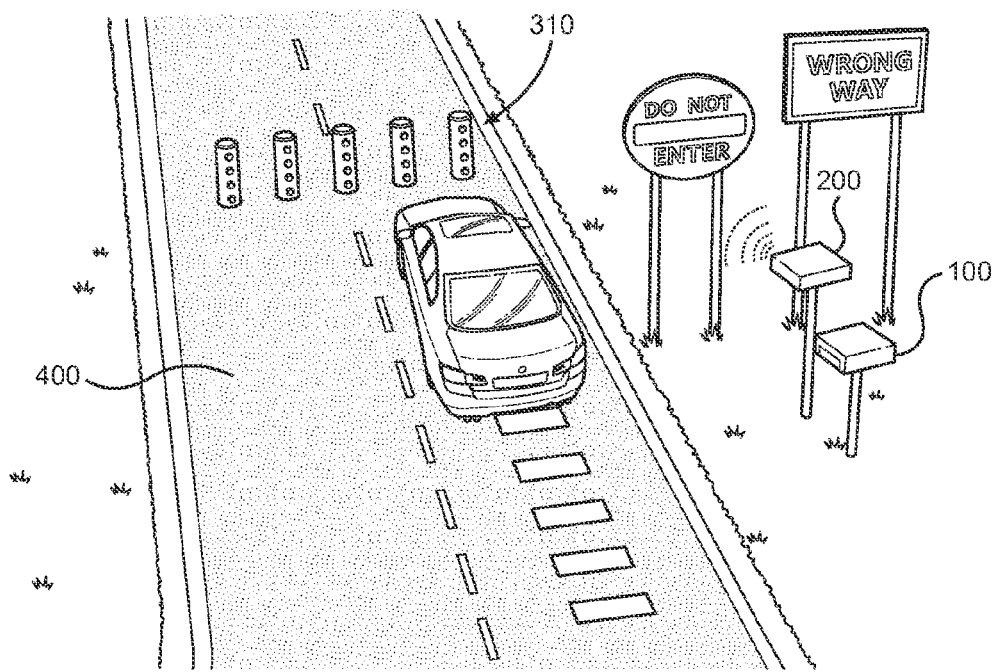
FIG. 3 shows a perspective view of the traffic safety system in use and activated by an oncoming vehicle.

The activated system is shown in FIG. 3. An automobile is shown driving the wrong way down the one way road 40. The motion detection unit 100 identifies the presence of a vehicle approaching from the wrong direction and sends electrical pulses or wireless communication signals to the camera unit 200 and the barrier 310. Upon receiving the signals, the barrier deploys, rising up out of the road, and the camera begins photographing the vehicle. Similarly, lights on the opposing warning signs, those located at the other entrance to the road, will begin to flash, indicating that it is not safe to enter the road due to blockage.

If the car does not stop moving, or collides with the barrier, the camera unit transmits images of the scene along with the vehicle's license plate to nearby authorities. Transmission may occur via wireless signals such as cellular signals, satellite, or may occur via a landline telephone connection, or coaxial/digital cable connection. In this way, authorities are notified that an accident has occurred or that a driver is in distress, or inebriated and is incapable of retreating from the area.

In a preferred embodiment the motion detection unit also identifies retreat of the car from the one-way road. Once the car moves backward past the motion detection unit, the barrier is signaled to initiate retraction. This system reset functionality reduces the amount of time that law-abiding motorists are prevented from traveling down the road, because the barrier is lowered once the threat of collision has passed. Alternatively, the system may be manually reset by proper authorities, via an interaction with input on one or both of the motion detection and camera unit.

Figure 4A:
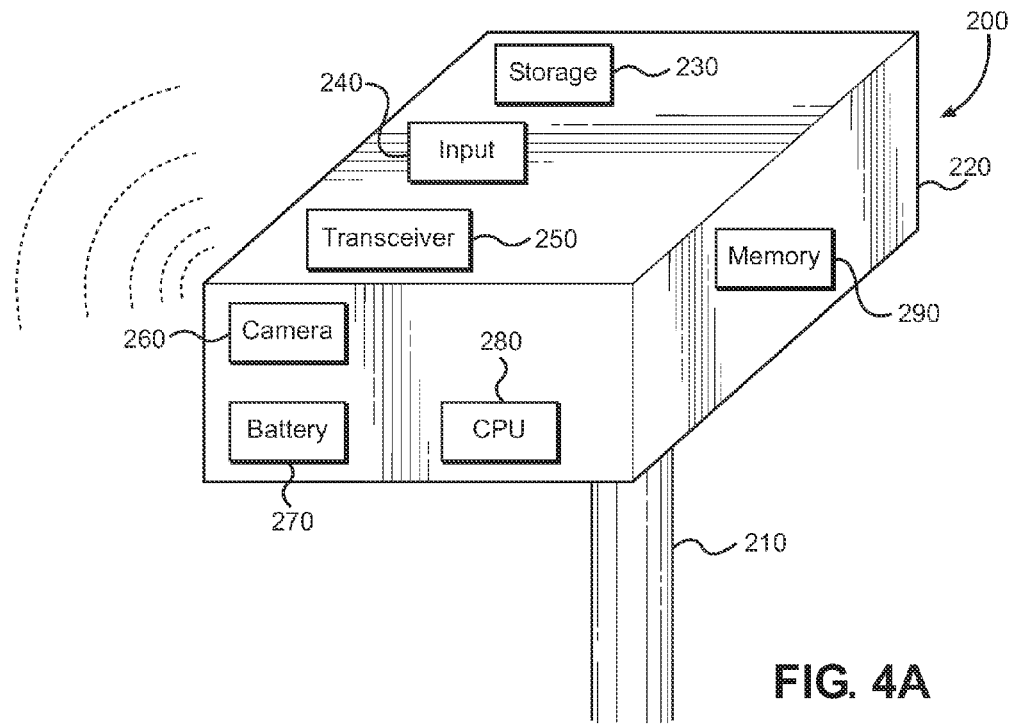
FIGS. 4A-4B show general schematic diagrams of the motion detection unit and camera unit.

A view of the components of an exemplary camera unit are shown in FIG. 4A. The camera unit 200 has a digital camera 260 a central processing unit 280, a memory 290, a storage media 230, a communications means such as a transceiver 250, and optionally an input means 240 for interacting with the traffic safety system. These components are stored within the camera unit housing 220 and are powered by a battery 270 or in ground electrical connection.

Activation signals are received into memory, and processed by the CPU, which then initiates photographing. Images taken with the digital camera are stored on the storage media, and may be transferred via the communication link as needed. By way of example, the images may be immediately transferred upon the occurrence of a collision, or failure to stop. Alternatively, the images may be stored until law enforcement or other authorities pair a wireless device with the camera unit and transfer the images to the wireless device for review. Physical transfer means such as universal serial bus (USB) connections are also contemplated.

Figure 4B:
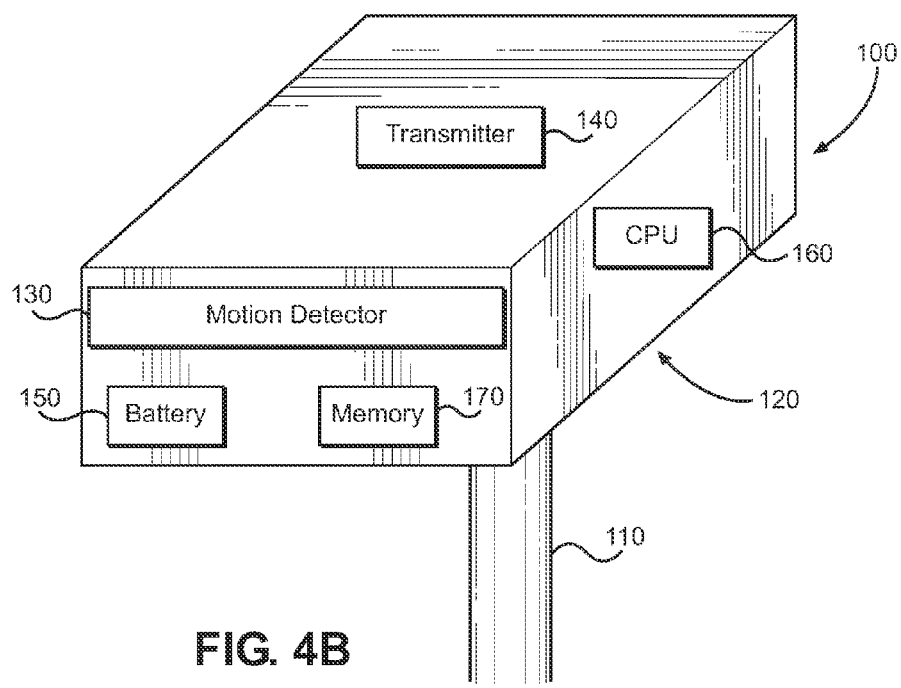

Turning finally to FIG. 4B there is shown a collection of components in an exemplary motion detection unit. The motion detection unit 100 has a central processing unit 160, a memory 170, a motion detection sensor 130, and may optionally include a transmitter 140 if wireless transmission of activation signals is desired. Components are bowered by a battery 150 and stored within the motion detection unit housing 120.

The motion detector may be optical having infra-red sensors or laser beam sensors. Alternatively, acoustic motion detectors may be used. It is generally not preferred that camera based motion detection be used due to the high rate of speed at which motorists travel, and because the camera should be free to collect photographs for evidentiary purposes. But, in low-speed zones, a camera based motion detection system may be employed so long as it is separate from the camera in the camera unit.

In an alternative embodiment, the system may employ two motion detection units. The second motion detection unit may be combined with the camera unit to reduce clutter, or may be separate. This embodiment uses a first motion detection unit to identify a vehicle entering a one-way road from the wrong direction and initiates audio or visual feedback. If the motorist does not stop the vehicle and passes the second motion detection sensor, the second sensor initiates barrier deployment and vehicle photographing. In some areas, such as on straight, one-way roads, the use of two motion detection units may be necessary to determine flow of traffic and prevent false positives from vehicles travelling in the proper direction. Thus, the first motion detection unit identifies movement along the road, and the second unit confirms that the motion is in the wrong direction. Only positive motion detection from the first and then the second unit will set off the system, while positives from the second then the first unit will not activate the barrier or signs, because this order implies proper direction of travel.

The exact configuration of the system will depend upon the specific landscape of the roadway, along with the average rate of speed and size of vehicles utilizing the roadway. Those of ordinary skill in the art will be able to position the herein described components in such a way that motion is detected when coming from the importer direction of travel, and photographs are taken of license plates when a motorist fails to stop or collides with the barrier. Thus, the present system provides a safe and easy to implement traffic control and safety system that reduces the likelihood of collisions on highway exit and entrance ramps as well as one-way roads.

To this point, the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A traffic control and safety system, comprising:
   a first optical motion detector capable of detecting the direction of travel of an oncoming motor vehicle;
   one or more warning indicators in communication with said first optical motion detector;
   wherein activation of said first optical motion detector initiates visual or audible feedback from said one or more warning indicators;
   a second optical motion detector in communication with said first optical motion detector, such that detection of said oncoming motor vehicle by said first optical motion detector, activates a camera stored within said second optical motion detector, and wherein said camera is positioned to photograph and store images of said oncoming motor vehicle;
   a barrier having a stowed and a deployed state, and in communication with said second optical motion detector;
   wherein detection of said oncoming motor vehicle by said second optical motion detector, initiates deployment of said barrier to the deployed state, and wherein the deployed state of said barrier blockades a portion of a roadway due to a driver's unresponsiveness to said one or more warning indicators;
   wherein said first optical motion detector must be activated prior to activation of said second optical motion detector in order to allow said oncoming motor vehicle traveling a wrong direction on said roadway to be warned prior to said barrier deployment via the one or more warning indicators, thereby preventing said barrier from being deployed unnecessarily;
   said second optical motion detector is adapted to transmit said images to an external computer.

2. The system of claim 1, wherein said second optical motion detector is electrically connected to said barrier.

3. The system of claim 1, wherein said first optical motion detector transmits activation signals to said second optical motion detector.

4. The system of claim 1, wherein said second optical motion detector has a digital cable connection facilitating transmission of stored images.

5. The system of claim 1, wherein said second optical motion detector has a wireless communication means facilitating transfer of stored images, and transmission of activation signals.

6. The system of claim 1, wherein said warning indicators are illuminated signs.

* * * * *